US007234130B2

(12) United States Patent
Word et al.

(10) Patent No.: US 7,234,130 B2
(45) Date of Patent: Jun. 19, 2007

(54) LONG RANGE CORRECTIONS IN INTEGRATED CIRCUIT LAYOUT DESIGNS

(76) Inventors: James Word, 10943 SW. Adele Dr., Portland, OR (US) 97225; Nicolas B. Cobb, 1496 Flamingo Way, Sunnyvale, CA (US) 94087; Yuri Granik, 554 Driscoll Pl., Palo Alto, CA (US) 94306

(*) Notice: Subject to any disclaimer, the term of this patent is extended or adjusted under 35 U.S.C. 154(b) by 0 days.

(21) Appl. No.: 11/066,597

(22) Filed: Feb. 24, 2005

(65) Prior Publication Data

US 2005/0216878 A1 Sep. 29, 2005

Related U.S. Application Data

(60) Provisional application No. 60/547,484, filed on Feb. 25, 2004.

(51) Int. Cl.
*G06F 17/50* (2006.01)
(52) U.S. Cl. .............................. 716/21; 716/19; 716/20
(58) Field of Classification Search .................... 716/4, 716/19–21; 378/34–35; 430/30–31
See application file for complete search history.

(56) References Cited

U.S. PATENT DOCUMENTS

| | | | |
|---|---|---|---|
| 4,762,396 A | 8/1988 | Dumant et al. | |
| 4,989,156 A * | 1/1991 | Ikenaga | 716/21 |
| 5,502,654 A | 3/1996 | Sawahata | |
| 5,655,110 A | 8/1997 | Krivokapic et al. | |
| 5,723,233 A | 3/1998 | Garza et al. | |
| 5,825,647 A | 10/1998 | Tsudaka | |
| 5,879,844 A | 3/1999 | Yamamoto et al. | |
| 6,016,357 A | 1/2000 | Neary et al. | |
| 6,049,660 A | 4/2000 | Ahn et al. | |

(Continued)

FOREIGN PATENT DOCUMENTS

JP 09319067 A 12/1997

(Continued)

OTHER PUBLICATIONS

Cobb, N., and Y. Granik, "Model-Based OPC Using the MEEF Matrix," *Proceedings of SPIE, vol. 4889: 22nd Annual BACUS Symposium on Photomask Technology*, Monterey, Calif., Sep. 30-Oct. 4, 2002, p. 147.

(Continued)

*Primary Examiner*—Vuthe Siek
*Assistant Examiner*—Nghia M. Doan
(74) *Attorney, Agent, or Firm*—Klarquist Sparkman, LLP

(57) ABSTRACT

A method and apparatus for compensating for flare intensity variations across an integrated circuit. A layout description for a physical layer of an integrated circuit or portion thereof is divided into a number of regions such as adjacent tiles. An estimate of the flare intensity in each region is determined. The flare intensity values calculated are divided into a number of ranges. In one embodiment, a data layer in a layout description is defined for each range of flare values computed. Features to be printed in an area having a flare value in a particular range are associated with a corresponding additional data layer. The features associated with each additional data layer are analyzed with a resolution enhancement technique that is selected or adjusted to compensate for differing flare values occurring in the integrated circuit.

15 Claims, 4 Drawing Sheets

U.S. PATENT DOCUMENTS

| | | | |
|---|---|---|---|
| 6,056,785 A * | 5/2000 | Chisaka | 716/19 |
| 6,077,310 A | 6/2000 | Yamamoto et al. | |
| 6,120,952 A | 9/2000 | Pierrat et al. | |
| 6,128,067 A | 10/2000 | Hashimoto | |
| 6,187,483 B1 | 2/2001 | Capodieci et al. | |
| 6,243,855 B1 | 6/2001 | Kobayashi et al. | |
| 6,249,904 B1 | 6/2001 | Cobb | |
| 6,263,299 B1 | 7/2001 | Aleshin et al. | |
| 6,269,472 B1 | 7/2001 | Garza et al. | |
| 6,301,697 B1 | 10/2001 | Cobb | |
| 6,317,859 B1 | 11/2001 | Papadopoulou | |
| 6,370,679 B1 | 4/2002 | Chang et al. | |
| 6,425,117 B1 | 7/2002 | Pasch et al. | |
| 6,453,452 B1 | 9/2002 | Chang et al. | |
| 6,453,457 B1 | 9/2002 | Pierrat et al. | |
| 6,467,076 B1 | 10/2002 | Cobb | |
| 6,487,503 B2 * | 11/2002 | Inui | 702/22 |
| 6,499,003 B2 | 12/2002 | Jones et al. | |
| 6,665,845 B1 | 12/2003 | Aingaran et al. | |
| 6,728,946 B1 * | 4/2004 | Schellenberg et al. | 716/19 |
| 6,815,129 B1 * | 11/2004 | Bjorkholm et al. | 430/30 |
| 6,851,103 B2 * | 2/2005 | Van Den Broeke et al. | 716/21 |
| 6,862,726 B2 * | 3/2005 | Futatsuya et al. | 716/19 |
| 6,989,229 B2 | 1/2006 | Lucas et al. | |
| 7,010,776 B2 * | 3/2006 | Gallatin et al. | 716/19 |
| 2005/0050490 A1 * | 3/2005 | Futatsuya et al. | 716/4 |

FOREIGN PATENT DOCUMENTS

| | | |
|---|---|---|
| WO | WO 01/65315 A2 | 9/2001 |

OTHER PUBLICATIONS

Cobb, N., and A. Zakhor, "Experimental Results on Optical Proximity Correction With Variable Threshold Resist Model," *Proceedings of SPIE, vol. 3051: Symposium on Optical Microlithography X*, Santa Clara, Calif., Mar. 10-14, 1997, pp. 458-468.

Cobb, N., and A. Zakhor, "Fast, Low-Complexity Mask Design," *Proceedings of SPIE, vol. 2440: Symposium on Optical/Laser Microlithography VIII*, Santa Clara, Calif., Feb. 22-24, 1995, pp. 313-327.

Cobb, N., and A. Zakhor, "Fast Sparse Aerial Image Calculation for OPC," *Proceedings of SPIE, vol. 2621: 15th Annual BACUS Symposium on Photomask Technology and Management*, Santa Clara, Calif., Sep. 20-22, 1995, pp. 534-545.

Cobb, N., and A. Zakhor, "Large Area Phase-Shift Mask Design," *Proceedings of SPIE, vol. 2197: Symposium on Optical/Laser Microlithography VII*, San Jose, Calif., Mar. 2-4, 1994, pp. 348-360.

Cobb, N., et al., "Mathematical and CAD Framework for Proximity Correction," *Proceedings of SPIE, vol. 2726: Symposium on Optical Microlithography IX*, Santa Clara, Calif., Mar. 13-15, 1996, pp. 208-222.

Cobb, N., and Y. Granik, "Using OPC to Optimize for Image Slope and Improve Process Window," (Nov. 20, 2002), *Proceedings of SPIE, vol. 5130: Photomask, Japan*, Yokohama, Japan, Apr. 16-18, 2003, p. 42.

Granik, Y., "Generalized MEEF Theory," *Interface 2001*, Nov. 2001.

Granik, Y., and N. Cobb, "MEEF as a Matrix," *Proceedings of SPIE, vol. 4562: 21st Annual BACUS Symposium Photomask Technology*, Monterey, Calif., Oct. 2-5, 2001, pp. 980-991.

Granik, Y., and N. Cobb, "Two-Dimensional G-MEEF Theory and Applications," *Proceedings of SPIE, vol. 4754: Symposium on Photomask and Next-Generation Lithography Mask Technology IX* Yokohama, Japan, Apr. 23-25, 2002, pp. 146-155.

Maurer, W., et al., "Process Proximity Correction Using an Automated Software Tool," *Proceedings of SPIE Optical Microlithography XI*, Santa Clara, Calif., Feb. 22-27, 1998, pp. 245-253.

Mauer, W., et al., "Evaluation of a Fast and Flexible OPC Package: OPTISSIMO," *Proceedings of SPIE, vol. 2884: 16th Annual Symposium on Photomask Technology and Management*, Redwood City, Calif., Sep. 18-20, 1996, pp. 412-418.

Ohnuma, H., et al., "Lithography Computer Aided Design Technology for Embedded Memory in Logic," *Japanese Journal of Applied Physics* 37(12B):6686-6688, Dec. 1998.

Futatsuya, H., et al., "Model-based OPC/DRC considering local flare effects," Optical Microlithograph XVII, Proceedings of SPIE 5377:451-458, Bellingham, Washington, 2004.

Mack, C.A., "Measuring and Modeling Flare in Optical Lithography," Optical Microlithography XVI, Proceedings of the SPIE 5040:151-161, Jun. 2003.

Yao, T., et al., "Local Flare Effects and Correction in ArF Lithography," 2003 Symposium on VLSI Technology Digest of Technical Papers, Jun. 10-12, 2003.

* cited by examiner

US 7,234,130 B2

LONG RANGE CORRECTIONS IN INTEGRATED CIRCUIT LAYOUT DESIGNS

CROSS-REFERENCES TO RELATED APPLICATIONS

The present application claims the benefit of U.S. Provisional Patent Application No. 60/547,484, filed Feb. 25, 2004, which is herein incorporated by reference.

FIELD OF THE INVENTION

The present invention relates to resolution enhancement techniques for photolithographic processing and in particular to methods of compensating for long range variations across a layer of an integrated circuit.

BACKGROUND OF THE INVENTION

As the number of circuit elements to be created on an integrated circuit continually increases and the size of each element correspondingly decreases, each step in the creation of such circuits via photolithographic processing is analyzed to determine sources of possible processing distortions. For example, it is now common practice for circuit designers to apply one or more resolution enhancement technique (RETs) such as optical and process correction (OPC) that compensate for expected optical distortions that occur during the photolithographic process. One source of error that can be mitigated but not eliminated are long range intensity variations such as flare from the photolithographic printing system itself. Flare is caused by the scattering of illumination light due to defects or contamination on the lenses of the printing system. The effects of flare on an integrated circuit layout are typically inversely proportional to the number of features to be printed in a given area. That is, as the features to be printed in an area of an integrated circuit become more and more dense, the effects of flare are decreased. While it is not possible to eliminate flare, differences in flare intensity across the surface of an integrated circuit create processing variations. Increased flare in a given region generally increases the overall illumination in that portion of the integrated circuit, which affects the critical dimension or the smallest feature that can be printed on a semiconductor wafer.

While flare cannot be eliminated from the photolithographic printing system, it is desirable to have a mechanism for compensating for flare variations such that each region of the integrated circuit is processed similarly.

SUMMARY OF THE INVENTION

To address the above-mentioned problems and others, the present invention is a method for compensating for long range variations such as flare in a layer of an integrated circuit. An integrated circuit layout, or portion thereof, is received by a computer system. The layout or portion thereof is divided into a number of regions, such as adjacent tiles. An estimate of the flare in each region is determined and the flare values determined are divided into a number of ranges. A resolution enhancement technique that is applied to the features that are to be created in a region of the integrated circuit is selected or adjusted in accordance with the flare estimated to occur in the region.

In one embodiment, the flare values are estimated by determining a brightness value of the features in each region. The brightness value is used in a mathematical function to estimate the flare expected in each region. In one embodiment, the mathematical function is a convolution of an array of brightness values with a point spread function that models the flare in the photolithographic printing system.

In an embodiment of the invention, additional data layers in the layout description are associated with each range of flare values. The additional data layers are associated with features to be created in a region of the integrated circuit having a flare value in the range. Resolution enhancement techniques, such as OPC, can be selected or adjusted for the features associated with each additional data layer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

As indicated above, the present invention is a method for compensating for long range variations such as flare intensity across a layer of an integrated circuit or other device to be created with a photolithographic process.

Figure 1:
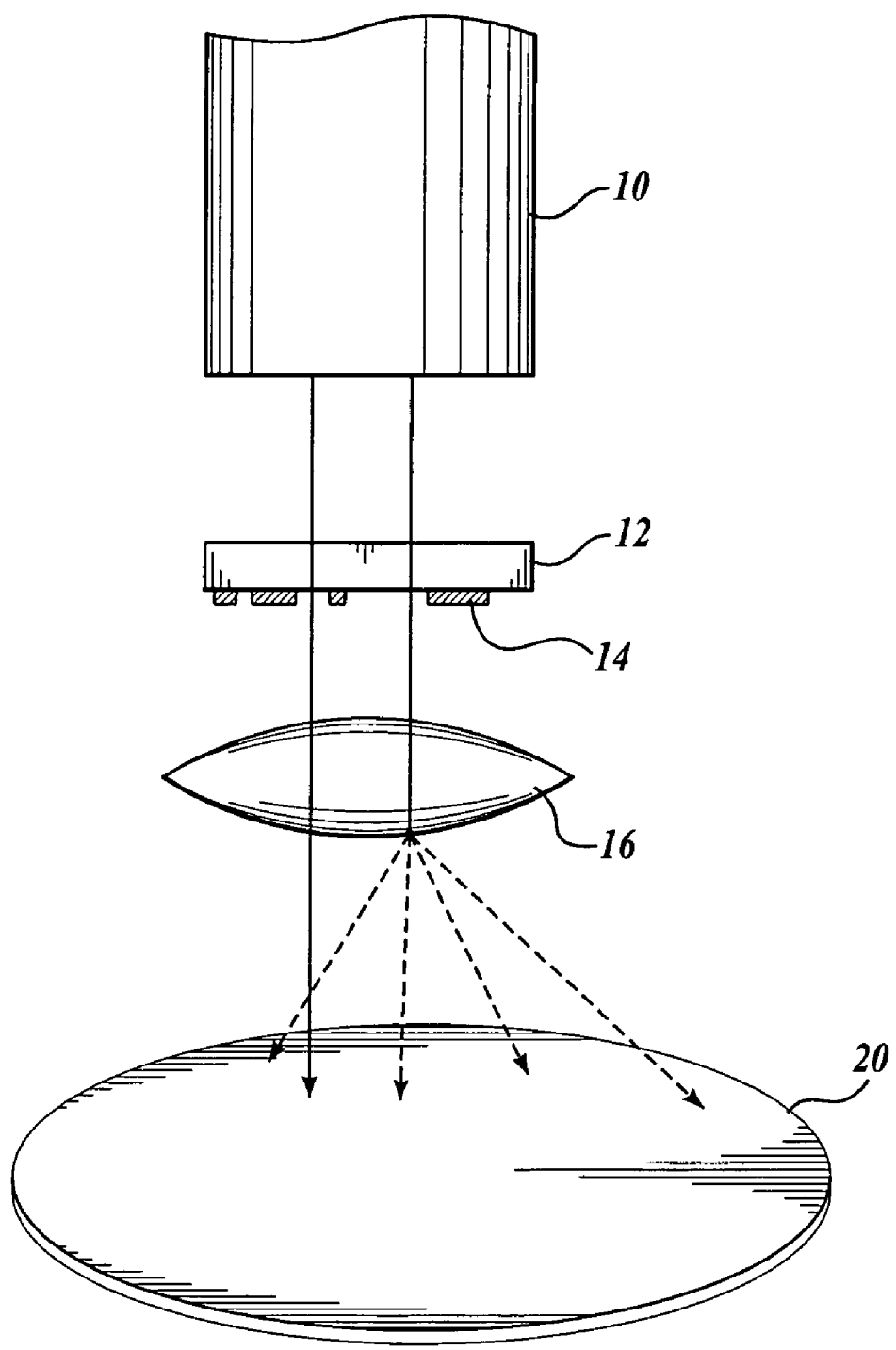
FIG. 1 is a simplified illustration of a photolithographic printing system.

FIG. 1 is a simplified illustration of a photolithographic imaging system. A light source 10 provides illumination light or electromagnetic energy that is delivered through a mask or reticle 12 that includes a pattern of features 14 to be imaged on a semiconductor wafer 20. Upon exposure of the semiconductor wafer to the illumination light through the mask 12, selective areas of photosensitive chemicals on the wafer are exposed. These exposed areas are then chemically and mechanically processed and polished in order to produce the desired pattern of circuit elements on the wafer.

If the illumination system were flawless, a single point of light originating from the light source 10 would pass through the mask 12 and a lens system 16 to be directed at a corresponding single point on the wafer 20. However, imperfections on the surface of the lens 16 and the other objects placed in the path between the light source and the wafer can cause scattering of the illumination light so that it falls within a broader area on the wafer 20. This process, often referred to as flare, increases the overall level of background light intensity falling on the wafer 20. The flare effects on the wafer cause the critical dimension, i.e., the smallest feature that can be resolved on a wafer, to vary. For example, areas of the wafer receiving large amounts of flare illumination light often have larger critical dimensions than those receiving less flare. As indicated above, the amount of flare light that an area of the integrated circuit receives is generally inversely proportional to the density of the features on a corresponding area of the mask 12. That is, areas of the mask that have fewer features permit more light to pass through the mask and consequently produce increased amounts of flare. Those areas of the mask having a dense concentration of features permit less illumination light to pass and correspondingly produce less flare.

In the past, attempts have been made to mitigate the effects of flare by inserting dummy patterns or subresolution features into a mask layout in order to even the amount of flare light falling across the surface of the integrated circuit. However, such dummy patterns are typically not useful in increasing overall pattern fidelity by which the pattern of features on a mask is imaged onto the wafer itself. Alternatively, flare can be compensated by biasing the edges of features on the mask. However, this technique is most useful with repeating patterns of features such as found in memory arrays, and is not generally applicable to circuit designs that may have varied patterns of features.

To improve the ability of a mask pattern to be printed on a wafer while lessening the variability of the critical dimensions and other artifacts due to variations in flare across the surface of the integrated circuit, the present invention selects or adjusts the resolution enhancement technique such as optical and process correction (OPC) in accordance with the amount of flare estimated to occur in a region of the integrated circuit.

Figure 2:
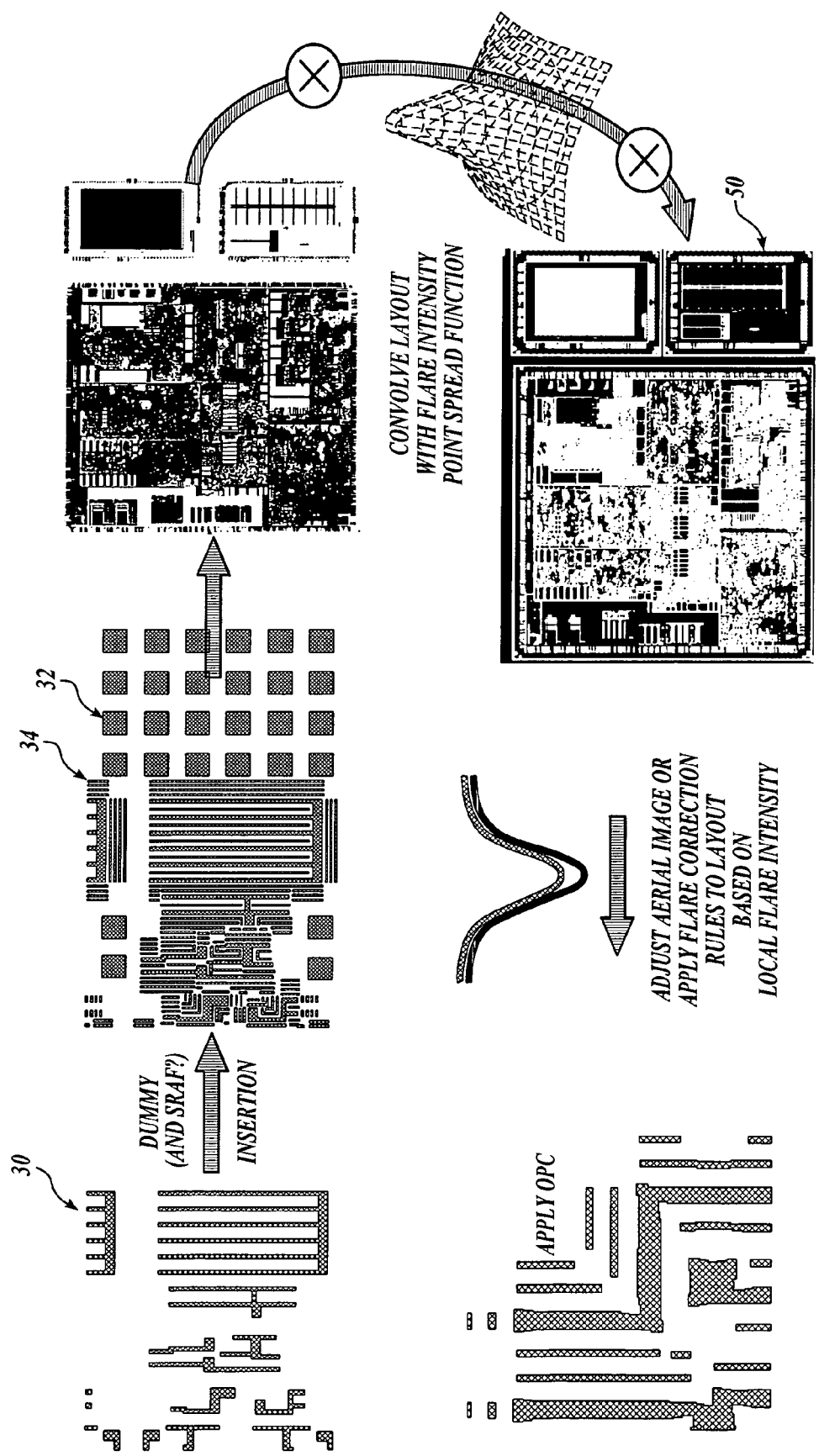
FIG. 2 is a flow diagram illustrating one method for compensating for variations in flare intensity in an integrated circuit layout in accordance with an embodiment of the present invention.

FIG. 2 illustrates one method for compensating for variations in flare intensity in accordance with an embodiment of the present invention. An integrated circuit layout 30 or portion thereof is read from a database or computer readable medium. The integrated circuit layout is typically defined in a layout description language or formats such as GDSII, OASIS, etc. In most layout descriptions, features to be created on an integrated circuit are defined in layers. Each physical layer of the integrated circuit (i.e., poly layer, metal 1, metal 2, etc.) may be formed with features defined in multiple layout description layers. If the layout description is defined hierarchically, each feature or group of features to be used at more than one location in the integrated circuit can be defined in its own layer.

In some situations, it is advisable to add dummy features 32 and subresolution features 34 to the layout description in order to fill up blank areas and reduce the variations of flare that may occur in the integrated circuit layout. However, the addition of dummy features 32 and subresolution features 34 is not necessary to practicing the invention. Next, the estimated flare intensity is computed across the layer of integrated circuit layout. In one embodiment of this invention, the flare intensity is computed by convolving a description of the layout with a point spread function such as a double-gaussian that is defined to estimate the flare intensity at each region of the integrated circuit.

In practice, the particular point spread function used is dependent on the characteristics of the photolithographic printing system to be used. Although a point spread function is currently preferred, it will be appreciated that other functions such as fractals, power series, top-hat functions, etc. could be used to estimate the flare intensity across the integrated circuit.

The estimates of the flare intensity produce a flare intensity map 50 whereby the intensity at each region of the integrated circuit layout is defined. Once the local flare intensity has been determined at each region of the integrated circuit, the layout description can be compensated such that variations in the local flare intensity have a minimal effect on the critical dimensions or other artifacts across the integrated circuit. For example, flare corrections can be made by selecting an OPC model that is dependent upon the flare intensity calculated at a given region of the integrated circuit. Alternatively, the aerial intensity image used to estimate how a mask feature will print on a wafer can be adjusted in accordance with the estimated flare in the region of the feature. In yet another embodiment, mask features can be selectively biased in accordance with the estimated flare value or additional features such as subresolution features can be added in accordance with the flare values calculated.

Figure 3:
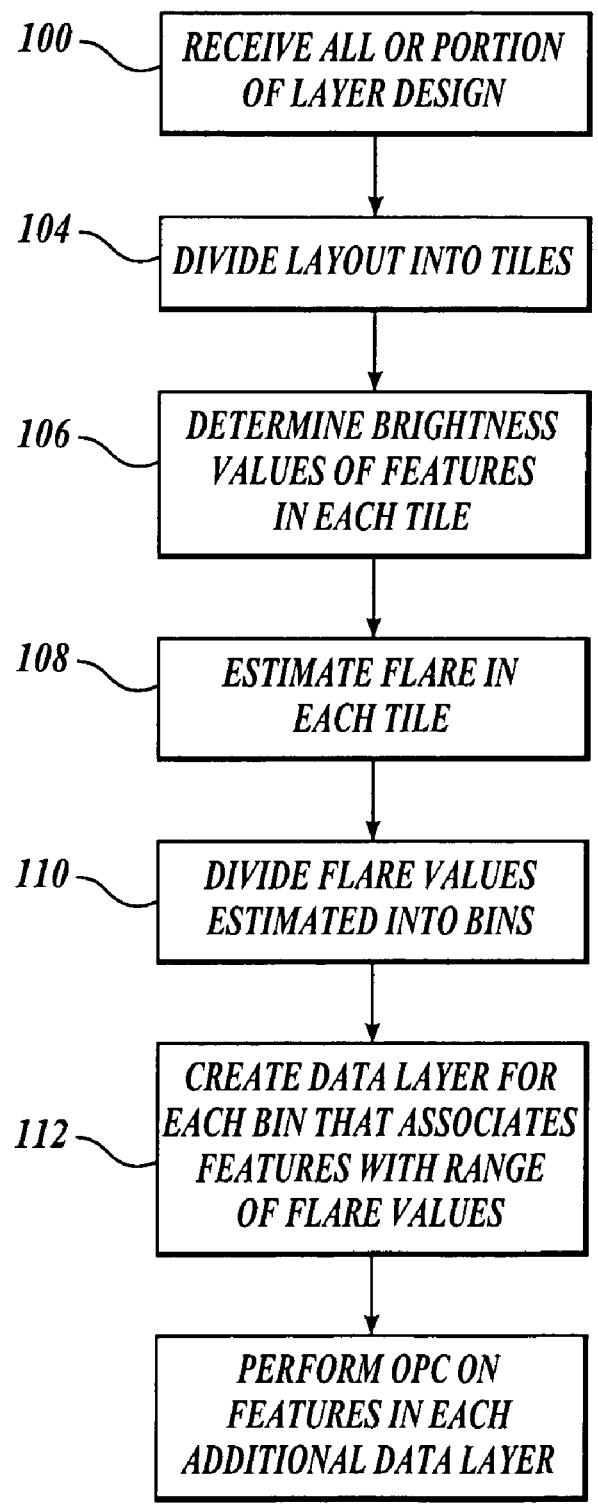
FIG. 3 is a flow diagram illustrating a method of compensating for variations in flare intensity in an integrated circuit in accordance with an embodiment of the present invention.

FIG. 3 is a flow diagram of one method of compensating for variations in flare intensity across an integrated circuit in accordance with an embodiment of the present invention. Beginning at 100, a layout description or portion thereof is received by a computer system. At 104, the layout is divided into a number of sections. In one embodiment, the sections comprise adjacent tiles. The size of these tiles is preferably larger than the grid layout of the integrated circuit. For example, if the integrated circuit is laid out on a 0.5 to 5 nm grid, each tile may comprise a square of tens of nanometers to many tens of microns with 1 micron being typical. The size of the tiles is selected as a compromise between the time required to process the layout description and the accuracy desired. At a step 106, a brightness value for the features in each tile is determined. The brightness value serves as a surrogate for the individual features defined in the region of the tile. The brightness value can be determined by computing the result of density of features in each tile.

At 108, the flare in each tile region is estimated. As described above, in one method of the present invention, the expected flare value for the tile region is estimated by convolving the flare point spread function with an array of brightness values to produce an array of flare intensity values. In one embodiment, the convolution assumes an infinitely repeating pattern of circuit layouts in order to simplify calculations as the edges of the circuit layout. However, alternate methods of estimating the flare within a region of the integrated circuit could also be used. Although the disclosed embodiment of the invention uses the function (1−density) to estimate the flare intensity, it will be appreciated that the value of density alone can also be used. The density approximates how dark the layout is in a given area and (1−density) approximates how bright the layout is in a given area.

At 110, the flare values determined for each tile are divided into a number of bins or ranges. For example, the flare values calculated might be divided into five bins between the lowest flare value estimated and the highest flare value estimated. Again, the number of bins or flare regions is selected as a compromise between the processing time required and accuracy of the results that are desired.

In one embodiment of the invention, additional data layers are defined in the layout description and a reference to each feature to be created in a region having a particular flare value is associated with an associated data layer. Therefore, at 112, a data layer in the layout description is defined for each bin or range of flare values. Features to be printed in an area of the integrated circuit associated with each flare range are defined and/or copied into in the additional data layers. If a feature is to be created in a portion of the integrated circuit having two or more different flare values, then the feature needs to be flattened (i.e., separately specified) in each additional data layer associated with the differing flare values.

At 114, the features in each additional data layer defined are processed in a manner that may or may not be affected by the flare values associated with the data layer. For example, flare values having a particular intensity may require that the OPC corrections for the features associated with the data layer be adjusted such as by biasing the features an additional or lesser amount. Alternatively, the aerial image model defined for a particular range of flare values may be adjusted in accordance with the flare values computed. Alternatively, subresolution features of a particular size or position may be inserted into the layout model for features having a particular flare value, etc. In the embodiment of the invention described, each feature associated with the data layer that is defined for a particular range of flare value is processed similarly.

Figure 4:
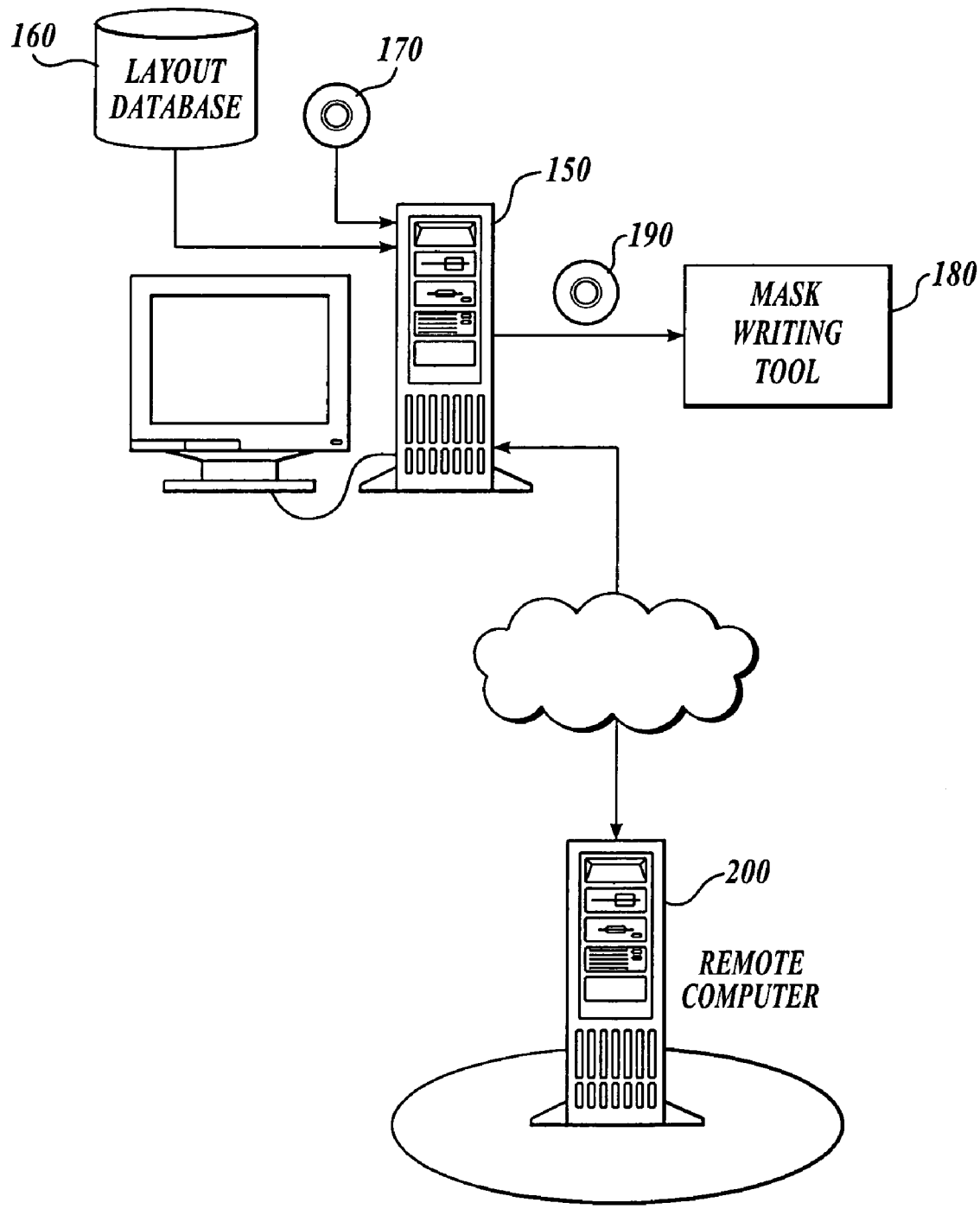
FIG. 4 illustrates one embodiment of a computer system used to implement the present invention.

FIG. 4 illustrates one embodiment of a computer system for implementing the flare compensation system of the present invention. A computer system 150 receives a layout design or portion thereof from a layout database 160, which may be stored on a computer readable media or received on a wired or wireless data communication network. The computer system 150 implements a series of instructions stored in a computer readable media, stored in a memory or received on a wired or wireless communication network 170. The instructions causes a computer system 150 to implement the flare compensation system described above. The computer system 150 estimates the flare intensity in a number of regions of an integrated circuit and selects or adjusts a resolution enhancement technique (RET) such as OPC, for the expected flare in each region. The results of the RET modify the layout description that is provided to a mask writing tool 180. The modified layout description may be written onto a computer readable media 190 for delivering to the mask writing tool or may be transferred to the mask writing tool via a wired or wireless communication network. The mask writing tool produces one or more masks having a pattern of features that are compensated for the expected variations in flare across the integrated circuit.

Alternatively, it is possible that the computer system 150 may transmit the layout description to a remotely located computer 200, which may be in or outside of the United States, in order to perform the estimated flare calculations and adjust the layout description to compensate for flare variations. The remotely located computer 200 can modify the layout description and return it to the local computer system 150 or supply it directly to the mask writing tool 180.

Although this invention has been presented as a method to compensate IC layouts for variations in optical flare, those skilled in the art will realize that this invention can be used for compensating a layout for any long-range effect which can be estimated in a manner that is similar to that used for optical flare. Such mathematical similarity can be, but is not limited to, convolution with a Gaussian function, a double Gaussian function, a summation of several Gaussian functions, a Lorentzian function, an Airy function, a Bessel function, a summation of Bessel functions, or another similar function.

Some effects that can be considered include the additional exposure by electrons that occurs during electron beam lithography for mask writing or direct writing on wafers, such as that from secondary electrons; additional "fogging" that occurs during electron beam lithography that occurs from additional scattering of electrons in the exposure chamber; density dependent etch loading that occurs during plasma etching; and density dependent polishing effects that occur during chemical-mechanical polishing (CMP). It should be noted that the convolutions may be performed in one dimension, along two orthogonal dimensions, or along several axes, depending on the specific geometry of the process in question.

It should also be noted that the convolution and parsing of features into different data layers may be adapted so that different flare values are applied to different subsets of features, e.g. to horizontal and vertical features. This would be used to compensate for asymmetric flare, such as has been observed for some Extreme Ultraviolet (EUV) lithography tools. Tagging of individual features such as line-ends or minimum dimension features, as for example described in U.S. Pat. No. 6,467,076 may also be used to selectively apply the flare calculation to certain subsets of features chosen for particular reasons.

While the preferred embodiment of the invention has been illustrated and described, it will be appreciated that various changes can be made therein without departing from the scope of the invention. Therefore, the scope of the invention is to be determined from the following claims and equivalents thereof.

The embodiments of the invention in which an exclusive property or privilege is claimed are defined as follows:

1. A method for compensating an integrated circuit layout for variations in flare intensity within different regions of the integrated circuit, comprising:
   receiving at least a portion of an integrated circuit layout having a number of data layers that define features to be created in a layer of the integrated circuit;
   estimating a flare intensity in a number of regions of the integrated circuit;
   dividing the estimated flare intensity values into a number of ranges between a lowest flare intensity value and a highest flare intensity value;
   creating a number of additional data layers, each of which is associated with a different range of flare intensity values and associating features to be created in the layer of the integrated circuit with one or more of the additional data layers; and
   processing the features associated with each of the additional data layers with a resolution enhancement technique that is selected or adjusted for the range of flare intensity values associated with the additional data layer.

2. The method of claim 1, wherein the flare intensity values in the regions of the layer of the integrated circuit are estimated by:
   dividing an area of the layer of the integrated circuit layout into a number of sections;
   estimating a brightness value of the features in each section;
   convolving the brightness value of each section with a point spread function to estimate the flare in that section.

3. The method of claim 2, wherein the brightness value is estimated by determining a density of the features of each section.

4. The method of claim 2, wherein the brightness value is estimated by computing the result of 1–the density of the features of each section.

5. The method of claim 2, wherein the sections are adjacent tiled regions of the integrated circuit.

6. The method of claim 1, wherein the resolution enhancement technique selected or adjusted for each feature in an additional data layer includes applying a bias value that is selected according to the range of flare intensity values associated with the additional data layer.

7. The method of claim 1, wherein the resolution enhancement technique selected or adjusted for each feature in an additional data layer includes applying an optical or process model that is selected according to the flare intensity values associated with the additional data layer.

8. The method of claim 1, wherein the resolution enhancement technique selected or adjusted for each feature in an additional data layer includes adjusting a local aerial image based on the computed local flare intensity value.

9. A method for compensating an integrated circuit layout for variations in flare intensity within different regions of the integrated circuit, comprising:
  receiving at least a portion of an integrated circuit layout that defines features to be created in a layer of the integrated circuit;
  estimating a flare intensity in a number of regions of the integrated circuit by determining a brightness value of the features in each region of the layout and convolving the brightness value determined for each region with a point spread function;
  dividing the estimated flare intensities for the regions into a number of ranges between a lowest flare intensity value and a highest flare intensity;
  defining one or more data layers in a layout database, each of which is associated with a range of flare intensity values; and
  associating the features defined in the integrated circuit layout with a corresponding data layer;
  processing the features associated with a data layer with a resolution enhancement technique that is selected or adjusted in a accordance with the range of flare intensity values associated with the data layer.

10. The method of claim 9, wherein the resolution enhancement technique selected or adjusted for each feature in an additional data layer includes applying a bias value that is selected according to the range of flare intensity values associated with the additional data layer.

11. The method of claim 9, wherein the resolution enhancement technique selected or adjusted for each feature in an additional data layer includes applying an optical or process model that is selected according to the flare intensity values associated with the additional data layer.

12. The method of claim 9, wherein the resolution enhancement technique selected or adjusted for each feature in an additional data layer includes adjusting a local aerial image based on the computed local flare values.

13. A computer readable media containing a set of instructions that when executed by a computer system cause the computer system to perform the method of claim 1.

14. A computer readable media containing a set of instructions that when executed by a computer system cause the computer system to perform the method of claim 9.

15. A method for compensating an integrated circuit layout for variations in flare intensity within different regions of the integrated circuit, comprising:
  transmitting at least a portion of an integrated circuit layout having a number of data layers that define features to be created in a layer of the integrated circuit to a remote computer system that performs the method of:
  estimating a flare intensity in a number of regions of the integrated circuit;
  dividing the estimated flare intensity values into a number of ranges between a lowest flare intensity value and a highest flare intensity value;
  creating a number of additional data layers, each of which is associated with a different range of flare intensity values and associating features to be created in the layer of the integrated circuit with one or more of the additional data layers; and
  processing the features associated with each of the additional data layers with a resolution enhancement technique that is selected or adjusted for the range of flare intensity values associated with the additional data layer.

* * * * *

UNITED STATES PATENT AND TRADEMARK OFFICE
CERTIFICATE OF CORRECTION

| | | |
|---|---|---|
| PATENT NO. | : 7,234,130 B2 | Page 1 of 1 |
| APPLICATION NO. | : 11/066597 | |
| DATED | : June 19, 2012 | |
| INVENTOR(S) | : Word et al. | |

It is certified that error appears in the above-identified patent and that said Letters Patent is hereby corrected as shown below:

Title Page, Item (56)

In the References Cited:

Page 2, Column 2, line 17, "Symposium Photomask" should be --Symposium on Photomask--.

Page 2, Column 2, line 22, "*IX*Yokohama" should be --IX, Yokohama--.

Page 2, Column 2, line 24, "SPIE Optical" should be --SPIE, Vol. 3334: Optical--.

Page 2, Column 2, line 27, "Mauer" should be --Maurer--.

Page 2, Column 2, line 35, "Microlithograph" should be --Microlithography--.

In the Specification:

Column 1, line 26, "technique" should be --techniques--.

Column 4, line 58, "into in the" should be --into the--.

Column 5, line 21, "instructions causes" should be --instructions cause--.

In the Claims:

Claim 1, column 6, line 32, "associated with a different range" should be --associated with one of the ranges--.

Claim 9, column 7, line 22, "associated with a range" should be --associated with one of the ranges--.

Claim 9, column 7, line 28, "in a accordance" should be --in accordance--.

Claim 15, column 8, line 27, "with a different range" should be --with one of the ranges--.

Signed and Sealed this
Thirteenth Day of November, 2012

David J. Kappos
*Director of the United States Patent and Trademark Office*